United States Patent
Lawal et al.

(10) Patent No.: US 12,186,708 B2
(45) Date of Patent: Jan. 7, 2025

(54) MULTI-STAGE SWEEPING GAS MEMBRANE DISTILLATION SYSTEM AND PROCESS

(71) Applicants: Saudi Arabian Oil Company, Dhahran (SA); King Fahd University of Petroleum & Minerals, Dhahran (SA)

(72) Inventors: Dahiru Umar Lawal, Dhahran (SA); Turki Nabieh Baroud, Dhahran (SA); Hasan Al Abdulgader, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 0 days.

(21) Appl. No.: 17/892,269

(22) Filed: Aug. 22, 2022

(65) Prior Publication Data
US 2024/0058757 A1 Feb. 22, 2024

(51) Int. Cl.
*B01D 61/36* (2006.01)
*C02F 1/44* (2023.01)

(52) U.S. Cl.
CPC ....... *B01D 61/3641* (2022.08); *B01D 61/366* (2013.01); *C02F 1/447* (2013.01);
(Continued)

(58) Field of Classification Search
CPC .. C02F 1/447; C02F 2103/08; C02F 2103/10; C02F 1/02; B01D 61/364; B01D 61/366;
(Continued)

(56) References Cited

U.S. PATENT DOCUMENTS

| | | |
|---|---|---|
| 3,878,054 A | 4/1975 | Rodgers |
| 10,392,270 B2 | 8/2019 | Swaminathan et al. |

(Continued)

FOREIGN PATENT DOCUMENTS

| | | |
|---|---|---|
| JP | H09108547 | 4/1997 |
| WO | WO 2013151498 | 10/2013 |
| WO | WO 2015162314 | 10/2015 |

OTHER PUBLICATIONS

Experimental evaluation of two consecutive air-gap membrane distillation modules with heat recovery, Water Science & Technology : Water Supply; London vol. 20, Iss. 5, (Aug. 2020). (Year: 2020).*

(Continued)

*Primary Examiner* — Pranav N Patel
(74) *Attorney, Agent, or Firm* — Fish & Richardson P.C.

(57) ABSTRACT

A multi-stage sweeping gas membrane distillation (MS-SGMD) system and a method of use are provided. The MS-SGMD includes a plurality of modules, wherein each module includes a feed chamber fluidically coupled to a feed line and a carrier gas line, wherein the feed line introduces a liquid feed into the feed chamber from a liquid feed tank, and wherein the carrier gas line introduces a carrier gas into the feed chamber. Each module includes a sweeping gas chamber fluidically coupled to a sweeping gas line and a sweeping gas return line, wherein a sweeping gas is passed through the sweeping gas chamber. Each module further includes a membrane separating the feed chamber from the sweeping gas chamber, wherein the membrane allows transportation of vapor from the feed chamber to the sweeping gas chamber while blocking liquid from moving from the feed chamber to the sweeping gas chamber.

12 Claims, 13 Drawing Sheets

(52) U.S. Cl.
CPC .... *B01D 2311/13* (2013.01); *B01D 2317/022* (2013.01); *C02F 2301/08* (2013.01)

(58) Field of Classification Search
CPC .... B01D 61/368; B01D 63/046; B01D 65/08; B01D 69/02; B01D 2311/04; B01D 2311/08; B01D 2311/103; B01D 2311/246; B01D 2311/2665; B01D 2313/26; B01D 2315/10; B01D 2321/185; B01D 2325/02; B01D 2325/38; B01D 2313/90; B01D 63/02; B01D 61/3641; B01D 2311/06; B01D 2311/10; B01D 2311/106; B01D 2311/25; B01D 2313/22; B01D 2313/221; B01D 1/14; B01D 2319/04; B01D 5/006

See application file for complete search history.

(56) References Cited

U.S. PATENT DOCUMENTS

| | | | |
|---|---|---|---|
| 11,345,619 | B1 | 5/2022 | Lawal et al. |
| 2004/0060808 | A1 | 4/2004 | Violette |
| 2014/0305789 | A1 | 10/2014 | Lowenstein |
| 2016/0074812 | A1 | 3/2016 | Lienhard et al. |
| 2016/0107121 | A1 | 4/2016 | Lienhard et al. |
| 2016/0310900 | A1* | 10/2016 | Francis .................. C02F 1/447 |
| 2017/0361277 | A1 | 12/2017 | Ghaffour et al. |
| 2019/0299164 | A1 | 10/2019 | Khalifa |
| 2020/0095138 | A1 | 3/2020 | Khalifa et al. |
| 2020/0109070 | A1 | 4/2020 | Hashimoto et al. |
| 2021/0060492 | A1 | 3/2021 | Klaehn et al. |
| 2021/0260531 | A1 | 8/2021 | Falath et al. |
| 2021/0339197 | A1* | 11/2021 | Mitra ..................... B01D 63/10 |
| 2022/0143553 | A1 | 5/2022 | Lawal et al. |
| 2022/0144671 | A1 | 5/2022 | Lawal et al. |

OTHER PUBLICATIONS

U.S. Appl. No. 17/892,284, Lawal et al., filed Aug. 22, 2022.
U.S. Appl. No. 17/892,306, Lawal et al., filed Aug. 22, 2022.
U.S. Appl. No. 17/892,347, Lawal et al., filed Aug. 22, 2022.
U.S. Appl. No. 17/892,380, Lawal et al., filed Aug. 22, 2022.
Alkhudhiri et al., "Air gap membrane distillation: a detailed study of high saline solution," Desalination, 2017, 403:179-186, 8 pages.
Alklaibi et al., "Transport analysis of air-gap membrane distillation," Journal of Membrane Science, 2005, 255(1):239-253, 15 pages.
Cao et al., "Seawater desalination based on a bubbling and vacuum-enhanced direct contact membrane distillation," International Journal of Chemical Engineering, Oct. 2021, 2021:3587057, 15 pages.
Chen et al., "Performance enhancement and scaling control with gas bubbling in direct membrane distillation," Desalination, Jan. 2013, 308:47-55, 9 pages.
Cui et al., "The use of gas bubbling to enhance membrane processes," Journal of Membrane Science, Aug. 2003, 221(1-2):1-35, 35 pages.
Essalhi et al., "Application of a porous composite hydrophobic/hydrophilic membrane in desalination by air gap and liquid gap membrane distillation: a comparative study," Separation Purification Technology, 2014, 133:176-186, 11 pages.
Francis et al., "Material gap membrane distillation: a new design for water vapor flux enhancement," Journal of Membrane Science, 2013, 448:240-247, 8 pages.
Gao et al., "Experimental study of hollow fiber permeate gap membrane distillation and its performance comparison with DCMD and SGMD," Separation and Purification Technology, Nov. 2017, 188:11-23, 13 pages.
Janajreh et al., "Numerical investigation of air gap membrane distillation (AGMD): Seeking optimal performance," Desalination, 2017, 424:122-130, 9 pages.
Jiang, "Separation of water out of highly concentrated electrolyte solutions using multistage vacuum membrane distillation," Masters of Science Thesis, LTH School of Industrial Engineering and Management, 2013, 82 pages.
Khalifa et al., "Application of Response Surface and Taguchi Optimization Techniques to Air Gap Membrane Distillation for Water Desalination—A Comparative Study," Desalination and water treatment, 2016, 57(59):28513-28530, 19 pages.
Khalifa et al., "Experimental and theoretical investigation on water desalination using air gap membrane distillation," Desalination, 2015, 376:94-108, 15 pages.
Khalifa et al., "Flux enhanced water gap membrane distillation process-circulation of gap water," Separation and Purification Technology, 2020, 231:1-9, 9 pages.
Khalifa et al., "Performance and Optimization of Air Gap Membrane Distillation System for Water Desalination," Arabian Journal for Science and Engineering, 2015, 13 pages.
Khalifa et al., "Water and air gap membrane distillation for water desalination—An experimental comparative study," Separation and Purification Technology, 2015, 141:276-284, 9 pages.
Khalifa, "Performances of air gap and water gap MD desalination modules," Water Practice and Technology, 2018, 13 (1):200-209, 10 pages.
Lawal et al., "Experimental investigation of an air gap membrane distillation unit with double-sided cooling channel," Desalination and Water Treatment, 2015, 57(24), 16 pages.
Li et al., "Microporous polypropylene and polyethylene hollow fiber membranes. Part 3. Experimental studies on membrane distillation for desalination," Desalination, 2003, 155(2):153-156, 4 pages.
Liu et al., "Experimental study of the optimal vacuum pressure in vacuum assisted air gap membrane distillation process," Desalination, 2017, 414:63-72, 10 pages.
Mahmoudi et al., "A unique permeate gap membrane distillation system for combined fresh water and power production," Energy Procedia, Feb. 2019, 160:170-177, 8 pages.
Naidu et al., "Hybrid membrane distillation: Resource, nutrient and energy recovery," Journal of Membrane Science, 2020, 599:1-21, 21 pages.
Pan et al., "Experimental and Numerical Investigations on Gas Injection-Enhanced Air Gap Membrane Distillation for Water Desalination," Ind. Eng. Chem. Res. 2022, 61:1850-1862, American Chemical Society, 2022, 13 pages.
Riera, "Integrated solution for DWTP reverse osmosis brine management: CO2 stripping followed by membrane distillation," Master's Thesis for the degree of Master of Science in Technology, School of Chemical Technology, Aalto University, 2015, 92 pages.
Swaminathan et al., "Energy efficiency of permeate gap and novel conductive gap membrane distillation," Journal of Membrane Science, Sep. 2016, 502, 20 pages.
SAIP Exam in Saudi Arabian Appln. No. 123450196, dated Apr. 24, 2024, 14 pages with English translation.

* cited by examiner

MULTI-STAGE SWEEPING GAS MEMBRANE DISTILLATION SYSTEM AND PROCESS

TECHNICAL FIELD

The present disclosure is directed to membrane distillation, and in particular, multi-stage sweeping gas membrane distillation.

BACKGROUND

Membrane distillation is a separation process that is driven by phase change. A membrane provides a barrier for a liquid phase while allowing a vapor phase to pass through. Membrane distillation can be used, for example, in water treatment. Several membrane distillation methods exist. Some examples include direct contact membrane distillation, air gap membrane distillation, vacuum membrane distillation, sweeping gas membrane distillation, vacuum multi-effect membrane distillation, and permeate gap membrane distillation.

The existing conventional membrane distillation systems are typically not efficient enough to be commercially feasible. Therefore, research has continued into the development of membrane distillation systems with a high rate of water permeate flux, reduced energy consumption, and efficient membrane fouling control.

SUMMARY

An embodiment disclosed by example herein provides a multi-stage sweeping gas membrane distillation (MS-SGMD) system. The MS-SGMD includes a plurality of modules, wherein each module includes a feed chamber fluidically coupled to a feed line and a carrier gas line, wherein the feed line introduces a liquid feed into the feed chamber from a liquid feed tank, and wherein the carrier gas line introduces a carrier gas into the feed chamber. Each module includes a sweeping gas chamber fluidically coupled to a sweeping gas line and a sweeping gas return line, wherein a sweeping gas is passed through the sweeping gas chamber. Each module further includes a membrane separating the feed chamber from the sweeping gas chamber, wherein the membrane allows transportation of vapor from the feed chamber to the sweeping gas chamber while blocking liquid from moving from the feed chamber to the sweeping gas chamber.

Another embodiment described by example herein provides a method for purifying a liquid using a multi-stage sweeping gas membrane distillation (MS-SGMD) system. The method includes feeding a liquid to a feed chamber in each of a plurality of modules, wherein the liquid in the feed chamber is at a temperature of greater than about 50° C. A carrier gas is fed through the liquid in the feed chamber of each of the plurality of modules to form humidified carrier gas. A sweeping gas is fed through a sweeping gas chamber in each of the plurality of modules, wherein the sweeping gas chamber in each module is separated from the feed chamber in each module by a membrane, and wherein the membrane allows vapor to pass across the membrane while blocking liquid flow across the membrane. A purified liquid is condensed from the sweeping gas. The purified liquid is condensed from the humidified carrier gas.

DETAILED DESCRIPTION

Figure 1A:
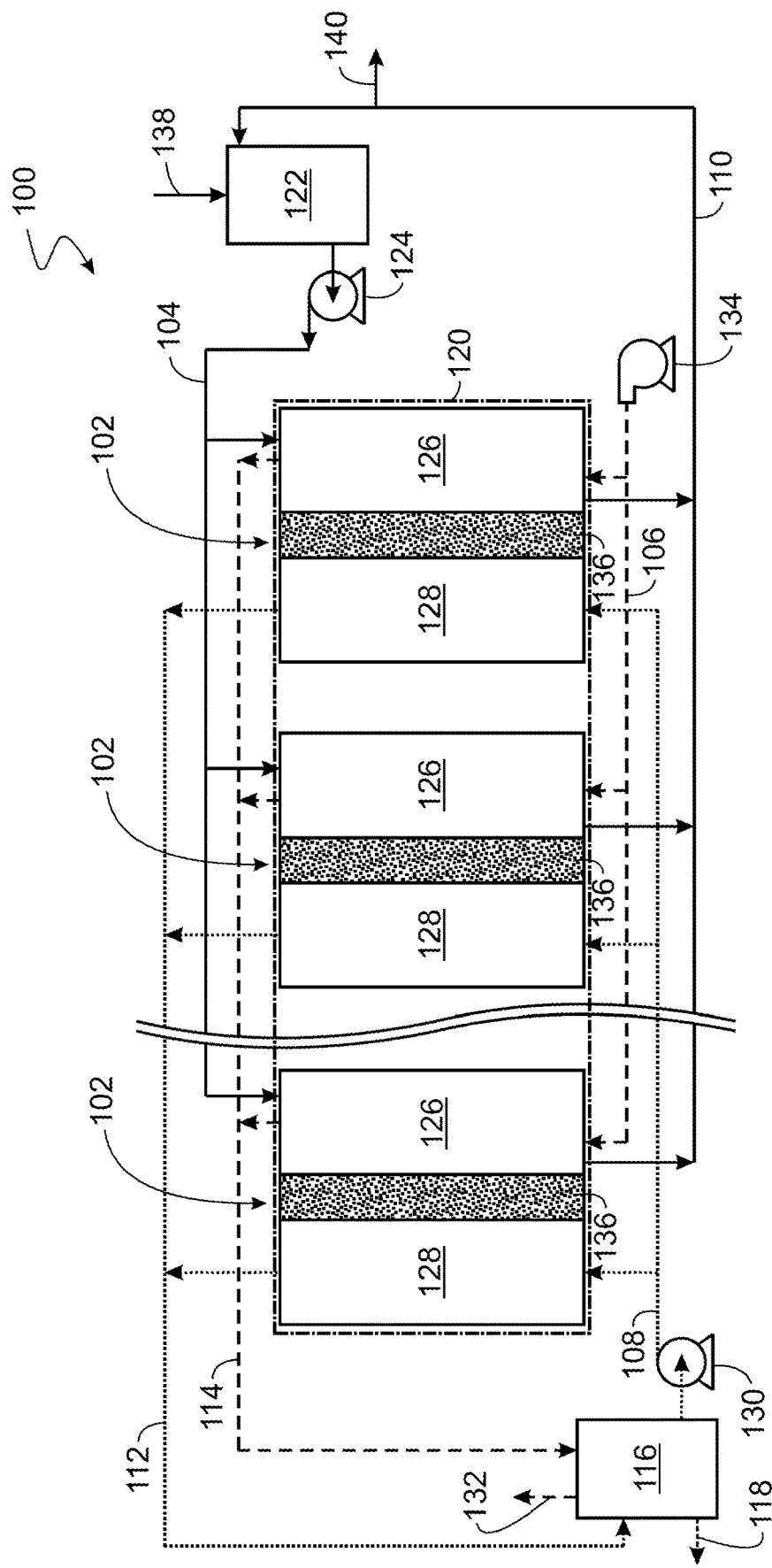
FIG. 1A is a simplified process flow diagram of a MS-SGMD system including a number of modules, in which each of the modules is fluidly connected in parallel to a feed line, a carrier gas line, and a sweeping gas line.

Membrane distillation (MD) is a combined thermal and membrane-based separation process, which allows vapor to permeate across a membrane while preventing liquid from crossing the membrane. The MD separation process is commonly applied in water desalination by separating water vapor from a brine stream using a micro- or nano-porous membrane, depending on the pore size desired. The feed liquid fed to the feed side of the MD is usually heated to encourage evaporation, while the temperature of the coolant stream received by the coolant side of the MD is usually kept lower than that of the feed stream temperature to encourage condensation. The driving force for water vapor permeation across the membrane is the vapor pressure difference. The vapor pressure difference is often induced by the temperature gradient across the membrane. Membrane distillation can be performed at a low feed temperature, for example, less than 100° C. The low operating temperatures allow membrane distillation to be operated using renewable energy and low-grade energy sources, such as solar energy, wind energy, geothermal energy, and waste heat.

Four types of membrane distillation configurations including sweeping gas membrane distillation (SGMD), vacuum membrane distillation (VMD), direct contact membrane distillation (DCMD) and air gap membrane distillation (AGMD). These MD configurations operate on the same principle, for example, vapor generation, vapor permeation across membrane, and vapor. The differences among these configurations lie in the design of the condensation chambers, while the feed chambers of the modules typically remain the same for all configurations. While direct contact membrane distillation system yields high permeate flux, it also has high conductive heat loss and high temperature polarization effects. Further, permeate contamination is possible in DCMD. AGMD is characterized by low conductive heat loss and low temperature polarization effect. However, AGMD yields low permeate flux from resistance to mass transfer in the air in the distillate chamber. Permeate gap membrane distillation (PGMD) has a higher permeate flux than AGMD. PGMD is sometimes referred to as liquid gap membrane distillation (LGMD) or water gap membrane distillation (WGMD). In PGMD, the stagnant air in the distillate chamber of an AGMD is replaced with a liquid, such as distilled water or deionized water. In PGMD, vapor from the feed stream permeates across the membrane pores and condenses at the interface between the permeate side of the membrane and the water in the distillate zone.

A multi-stage sweeping gas membrane distillation (MS-SGMD) system and a process for using the MS-SGMD are provided herein. The MS-SGMD has multiple modules, for example, two or more, in which membrane fouling is controlled, and water flux is improved, by passing, or bubbling a carrier gas through a feed chamber in each module. The feed chamber in each module is fed a stream of material to be treated. Each module also includes a sweeping gas chamber separated from the feed chamber by a vapor permeable membrane that is liquid impermeable. As vapor from the material to be treated passes through the membrane from the feed chamber to the sweeping chamber in each module, a stream of sweeping gas carries the vapor out of the sweeping chamber. The sweeping gas and the carrier gas are fed to an external condenser, outside of the modules, to condense the vapor and produce purified liquid. The process also produces a concentrated feed solution, which may be diluted by the addition of fresh feed.

The flow of the carrier gas through the feed chamber of the MS-SGMD increases the mass transfer coefficient in the feed chamber of the module by increasing the turbulent dissipation rate in the feed liquid, improving the rate of vapor permeation. Further, the carrier gas introduces turbulence in the feed chamber, which assists in loosening deposits from the membrane, lowering the scaling or fouling of the membrane and sweeping gas chamber in each module. Thus, the carrier gas may extend the operating life of the membranes and modules, reducing costs for operating the modules.

As the carrier gas passes through the feed chamber, it is at least partially saturated with water vapor from bubbling through the feed liquid. The vapor in the carrier gas can be directly fed to the external condenser or, in some embodiments, is mixed with the sweeping gas in the sweeping gas chambers before it is condensed in the external condenser, thereby enhancing the productivity of the MS-SGMD module.

FIG. 1A is a simplified process flow diagram of a MS-SGMD system 100 including a number of modules 102, in which each of the modules 102 is fluidly connected in parallel to a feed line 104, a carrier gas line 106, and a sweeping gas line 108. Each of the modules 102 are also connected in parallel to a feed return line 110, and a sweeping gas outlet line 112, and a carrier gas outlet line 114. An external condenser 116 is used to condense a fluid from the vapor flow in the sweeping gas outlet line 112 and the carrier gas outlet line 114. The fluid, such as purified water, is removed from the MS-SGMD system 100 through a distillate outlet 118. In the embodiment shown in FIG. 1A, the modules 102 are contained in a housing 120. In other embodiments, the modules 102 may be stand-alone units in individual housings. In some embodiments, a base set of modules 102 are enclosed in the housing 120, and additional modules 102 in individual housings are added to increase the capacity of the MS-SGMD system 100.

The feed line 104 provides a liquid feed to each of the modules 102 from a liquid feed tank 122, for example, by a pump 124. In some embodiments, the liquid feed is heated, for example, by a heating element in the liquid feed tank 122 or by a heat exchanger on the feed line 104, to provide a hot liquid feed in the feed line 104. In other embodiments, a heating element is inserted inside the feed chamber 126 of each module 102. A combination of both heating methods can be used. The temperature of the liquid feed is generally less than about 100° C., or less than about 75° C., or less than about 60° C., or between about 40° C. and about 60° C., or about 50° C. The temperature used may be selected based on the configuration of the modules, as described herein. Modules in which the feed is fluidically coupled in series may use a higher temperature in earlier modules in the series to reduce the need for heating later modules in the series. In some embodiments, the feed liquid in the feed chamber 126 is statically processed by filling and closing valves on the inlet points from the feed line 104 and outlet points from the feed chamber 126 to the feed return line 110. Alternatively, the feed liquid can be dynamically added to the feed chamber 126 from the feed line 104 under the flow of gravity by mounting of the liquid feed tank 122 higher than the modules 102, then partially opening the inlet points from the feed line 104 and outlet points from the feed chamber 126 to the feed return line 110. As mentioned herein, in some embodiments, the feed liquid is pumped through the feed chamber 126 using a pump 124. In some embodiments, the pump 124 is variable and a control system is used to reach a desired flowrate, for example, sufficient to keep the feed chamber 126 liquid full.

The feed liquid provided from the liquid feed tank 122 can be an aqueous solution, for example, seawater, industrial wastewater, brackish water, produced water, fruit juice, blood, milk, dye, hazardous waste water, brine solution, non-condensable gas, non-potable water, or any liquid including a dissolved salt, for example, a mixture of salts, a salt and organic contaminant mixture, a salt and inorganic contaminant mixture, or a combination of these.

The sweeping gas outlet line 112 is fluidically coupled to a sweeping gas chamber 128 in each of the modules 102.

The sweeping gas in the sweeping gas line 108 is provided by a vacuum pump 130, or other device on the condenser 116, such as a compressor, and other devices, which the gas flow. The condenser 116 will create some vacuum by condensing the distillate outlet 118 from the vapor in the sweeping gas outlet line 112 and the humidified gas in the carrier gas outlet line 114, assisting in the flow of the sweeping gas from the outlet of the sweeping gas chamber 128 of each module 102. The condenser 116 vents noncondensable gases through a vent line 132, such as the carrier gas from the carrier gas outlet line 114 and the sweeping gas from the sweeping gas outlet line 112. The carrier gas may be nitrogen, air, helium, argon, carbon dioxide, and the like. In some embodiments, different carrier gases may be used in different modules 102. For example, compressed air may be used in upstream modules 102, while dried compressed air is used in modules 102 that are downstream to increase the removal of water.

The carrier gas can be supplied to the carrier gas line 106 from a device such as a blower 134, compressor, gas tank, gas line, or the like. After exiting through the vent line 132, the carrier gas may be recycled in the process, for example, by being passed through a dryer and returned to the blower 134. The carrier gas may be injected to the feed chamber 126 at ambient conditions or may be heated prior to injection to feed chamber 126. In various embodiments, the injection into the feed chamber 126 is from a single point injector or a multiple point injector, such as a sparger or orifice fluidically coupled to the carrier gas line 106.

The heat source for the MS-SGMD system 100 can be from renewable energy sources, low-grade energy sources, electrical energy, waste heat from other thermal processes, or their combinations. As described herein, the heat can be applied to the liquid in the liquid feed tank 122, a heater in the feed chamber 126, or both.

The feed chamber 126 is separated from the sweeping gas chamber 128 by a membrane 136. In various embodiments, the membrane 136 in each of the modules 102 is a reinforced hollow tube, a non-reinforced hollow tube, a spiral wound tube, a flat sheet, or a non-flat sheet. The membrane 136 includes multiple pores that are sized to allow water vapor originating from the hot liquid to pass from the feed chamber 126 through the membrane 136 to the sweeping gas chamber 128. The membrane 136 prevents liquid flow between the feed chamber 126 and the sweeping gas chamber 128.

In various embodiments, the membrane 136 is a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, or a polymeric membrane. In some implementations, the membrane 136 includes a support layer and an active layer. The membrane 136 can be made, for example, from a porous material, such as a ceramic. In some implementations, a contact angle of a droplet of the liquid on the membrane 136 is greater than 90 degrees (°). In some embodiments, a different material is used for the membrane 136 in different modules 102. For example, the membrane 136 used in modules 102 that are upstream may have smaller effective pore sizes as more vapor may be released from more dilute liquid, while downstream modules 102 may have larger effective pore sizes as the more concentrated liquid may release less vapor.

As described herein, the sweeping gas chamber 128 is fluidically coupled to the sweeping gas outlet line 112, which pulls the water vapor from the sweeping gas chamber 128 to the condenser 116. As the water vapor from the sweeping gas outlet line 112 and the water vapor in the gas from the carrier gas outlet line 114 are condensed to form the water released from the distillate outlet 118, additional liquid is added to the liquid feed tank 122 through a make-up line 138. As the liquid feed is concentrated in the process, it may reach a point at which it is too concentrated for efficient separation. Accordingly, a portion of the liquid feed may be removed from a drain line 140, for example, fluidically coupled to the feed return line 110, to allow dilution of the liquid feed with fresh liquid added through the make-up line 138.

In some embodiments, the condenser 116 includes thin metallic tubes or thin polymeric tubes. The condenser 116 can be made, for example, from a metallic material, a composite material, or carbon fibers, among others. As described herein, the condensed water from the condenser 116 is removed through the distillate outlet 118. The water from the distillate outlet 118 has a water purity level that is greater than a water purity level of the liquid feed from the liquid feed tank 122.

The modules 102, including the chambers 126 and 128 and the membrane 136, of the MS-SGMD system 100 may be of any shape, such as rectangular, triangular, square, circular, cylindrical, hexagonal, or spherical. The housing 120 can be made, for example, from metallic material, polymeric material, composite material, carbon fiber, carbon nanotube, or sapphire. In some implementations, the housing 120 is made of steel, brass, copper, high-density polyethylene (HDPE), acrylic, or polyvinyl chloride (PVC).

In some implementations, the housing 120 includes a frame, support, gasket, or a combination of these, which can provide structural support, form the chambers 126 and 128 of the modules 102, and hold the membrane 136 between the chambers 126 and 128. The supporting structure can be made of a material that is non-corrosive and chemically inert in relation to the liquid feed. In various embodiments, the housing 120 is made, for example, from a metallic material, a polymeric material, a composite material, or carbon fibers, among others.

As described herein, the MS-SGMD system 100 removes water as vapor from the liquid feed using two different techniques. Water vapor is entrained in the carrier gas after it is bubbled through the liquid feed in the feed chamber 126. Further, water vapor is transported across the membrane pores from the feed chamber 126 to the sweeping gas chamber 128, and carried out from the sweeping gas chamber 128 through the sweeping gas outlet line 112. The driving force for mass/vapor transfer across the pores of the membranes is the partial pressure difference across the membrane 136, and thus, sweeping the vapor from the sweeping gas chamber 128 increases the partial pressure difference and increases the mass/vapor transfer.

The MS-SGMD system 100 is not limited to the configuration shown in FIG. 1A. In other configurations, the modules 102 are connected in series to one or more of the lines used for fluid flow through the modules 102, such as the feed line 104 and feed return line 110, the carrier gas line 106 and the carrier gas outlet 114, the sweeping gas line 108 and the sweeping gas outlet line 112. These configurations are discussed with respect to FIGS. 1B-1L.

Figure 1B:
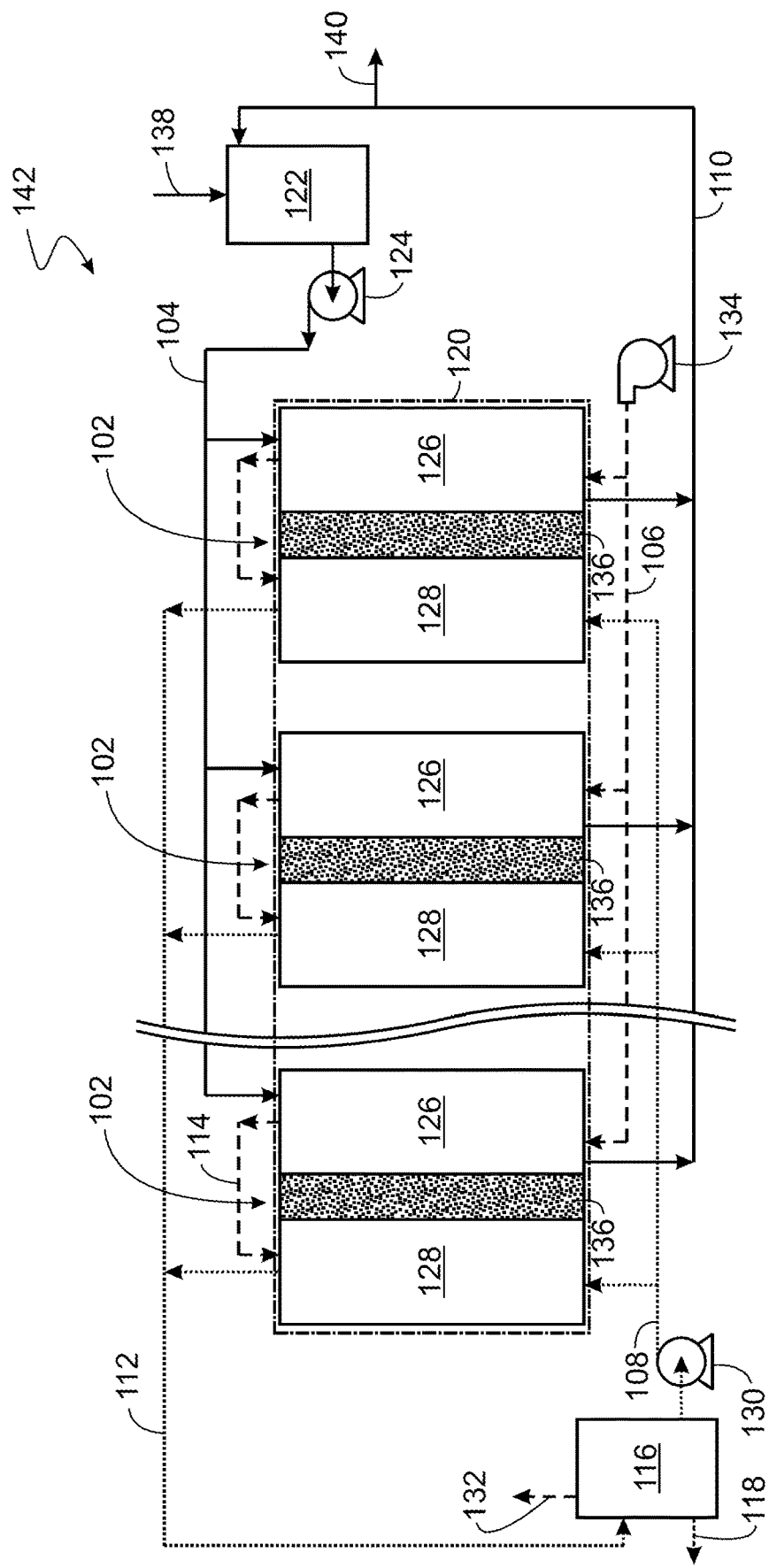
FIG. 1B is a simplified process flow diagram of a MS-SGMD system, wherein the modules are connected in parallel to the feed line, the feed return line, the carrier gas line, the sweeping gas line, and sweeping gas outlet line.

FIG. 1B is a simplified process flow diagram of a MS-SGMD system 142, wherein the modules 102 are connected in parallel to the feed line 104, the feed return line 110, the carrier gas line 106, the sweeping gas line 108, and sweeping gas outlet line 112. In this embodiment, the carrier gas outlet line 114 from the feed chamber 126 of each module 102 is fluidically coupled to an inlet on the sweeping gas chamber 128 of that module 102. Accordingly, the sweeping gas that is fed to the feed chamber 126 flows through the sweeping gas chamber 128 and is returned to the condenser 116 through the sweeping gas outlet line 112.

Figure 1C:
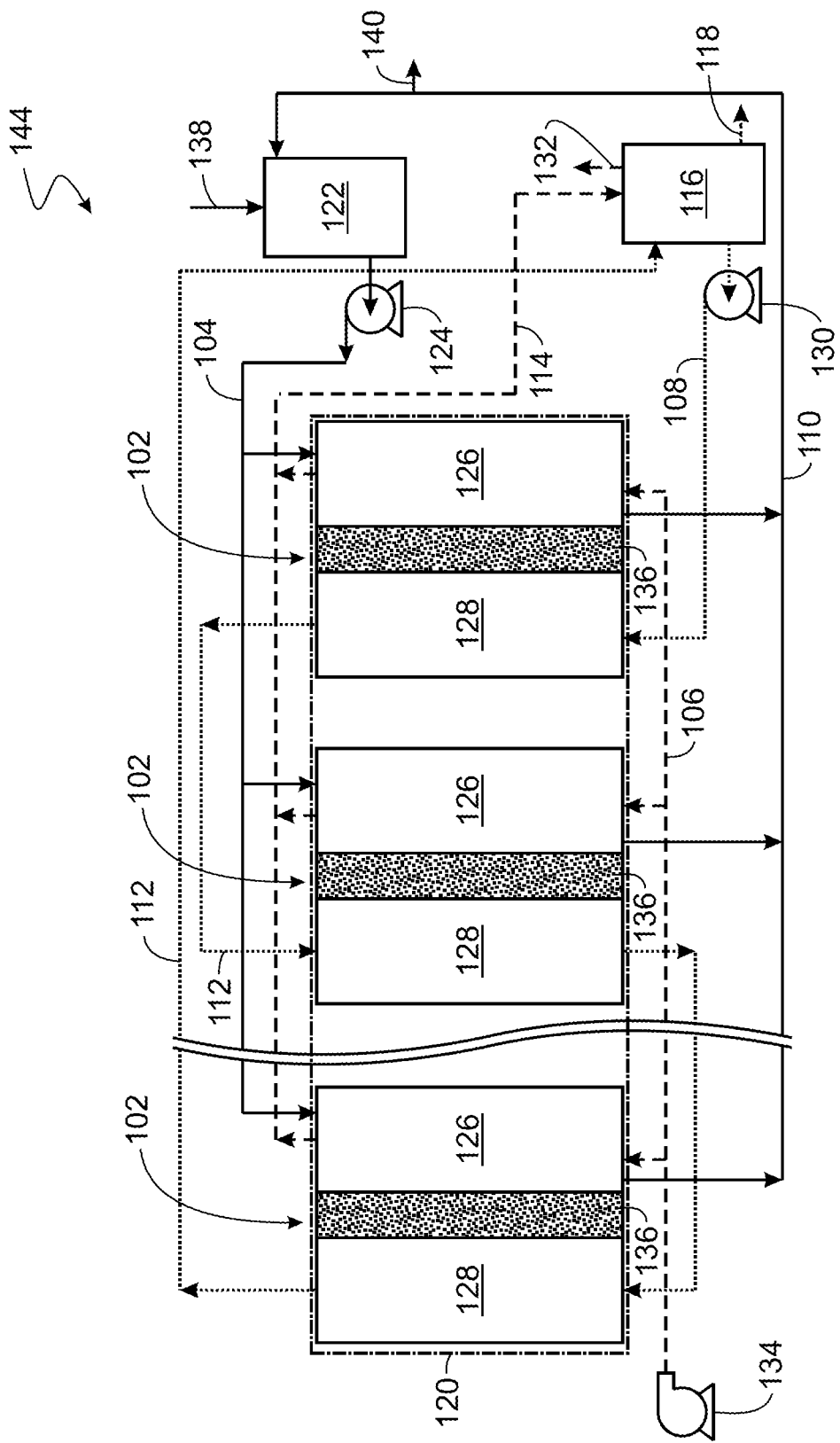
FIG. 1C is a simplified process flow diagram of a MS-SGMD, wherein the feed chamber of each of the modules is connected in parallel to the feed line, the feed return line, the carrier gas line, and the carrier gas outlet line, and in series with the sweeping gas line.

FIG. 1C is a simplified process flow diagram of a MS-SGMD 144, wherein the feed chamber 126 of each of the modules 102 is connected in parallel to the feed line 104, the feed return line 110, the carrier gas line 106, and the carrier gas outlet line 112, and in series with the sweeping gas line 108. In this embodiment, the sweeping gas line 108 is fluidically coupled to a sweeping gas chamber 128 on a first module 102, and then fluidically coupled from an outlet of the sweeping gas chamber 128 of the first module 102 to an inlet on the sweeping gas chamber 128 of a next module 102. An outlet of the sweeping gas chamber 128 of the last module 102 in the series is fluidically coupled to the condenser 116 through the sweeping gas outlet line 112.

Figure 1D:
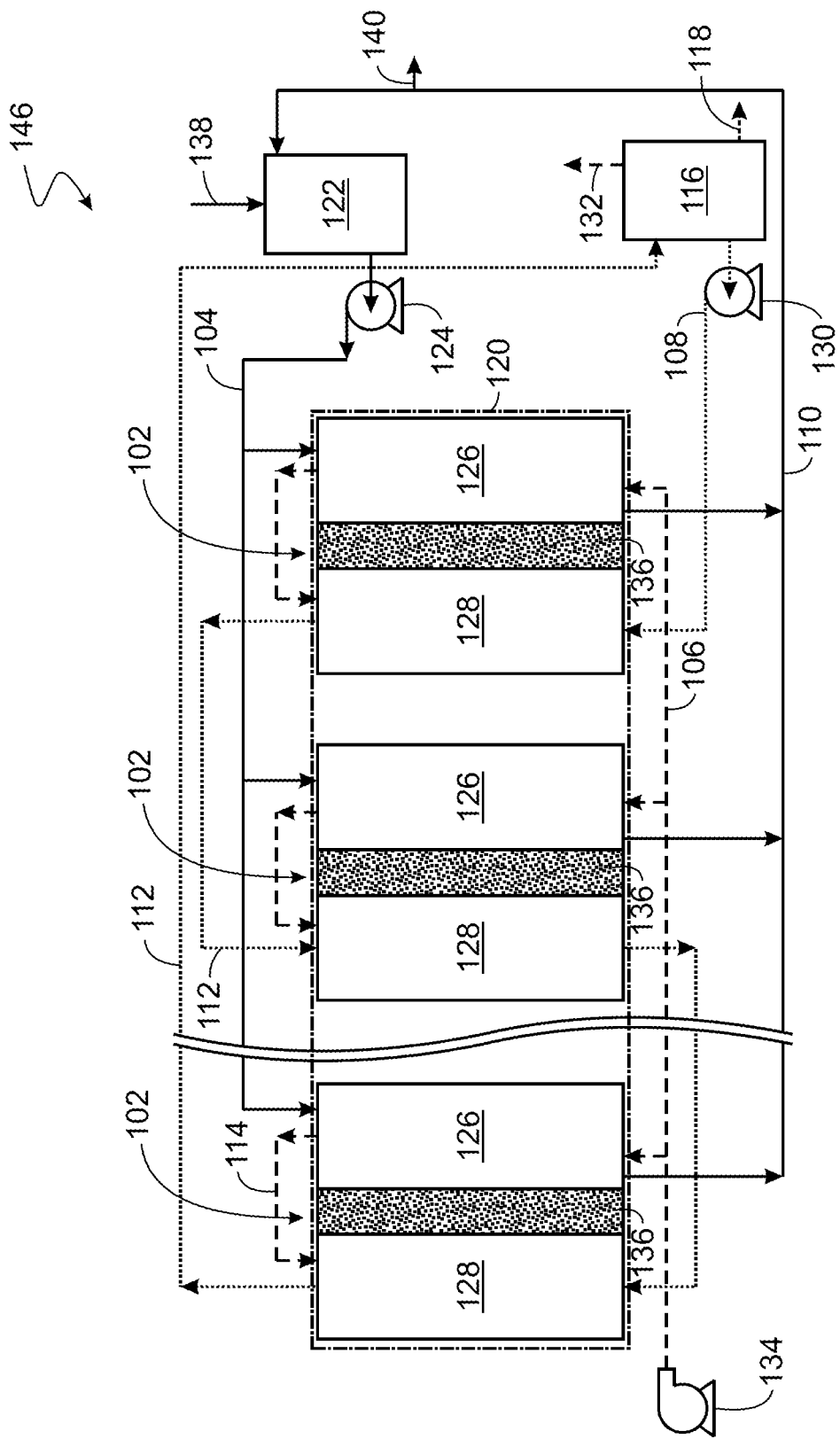
FIG. 1D is a simplified process flow diagram of a MS-SGMD system, wherein the feed chamber of each of the modules is connected in parallel to the feed line, the feed return line, and the carrier gas line, and in series to the sweeping gas line.

FIG. 1D is a simplified process flow diagram of a MS-SGMD system 146, wherein the feed chamber 126 of each of the modules 102 is connected in parallel to the feed line 104, the feed return line 110, and the carrier gas line 106, and in series to the sweeping gas line 108. In this embodiment, the sweeping gas line 108 is fluidically coupled to a sweeping gas chamber 128 on a first module 102, and then fluidically coupled from an outlet of the sweeping gas chamber 128 of the first module 102 to an inlet on the sweeping gas chamber 128 of a next module 102. An outlet of the sweeping gas chamber 128 of the last module 102 in the series is fluidically coupled to the condenser 116 through the sweeping gas outlet line 112. Further, the carrier gas outlet line 114 from the feed chamber 126 of each module 102 is fluidically coupled to an inlet on the sweeping gas chamber 128 of that module 102. Accordingly, the sweeping gas that is fed to the feed chamber 126 flows through the sweeping gas chamber 128 and is returned to the condenser 116 through the sweeping gas outlet line 112.

Figure 1E:
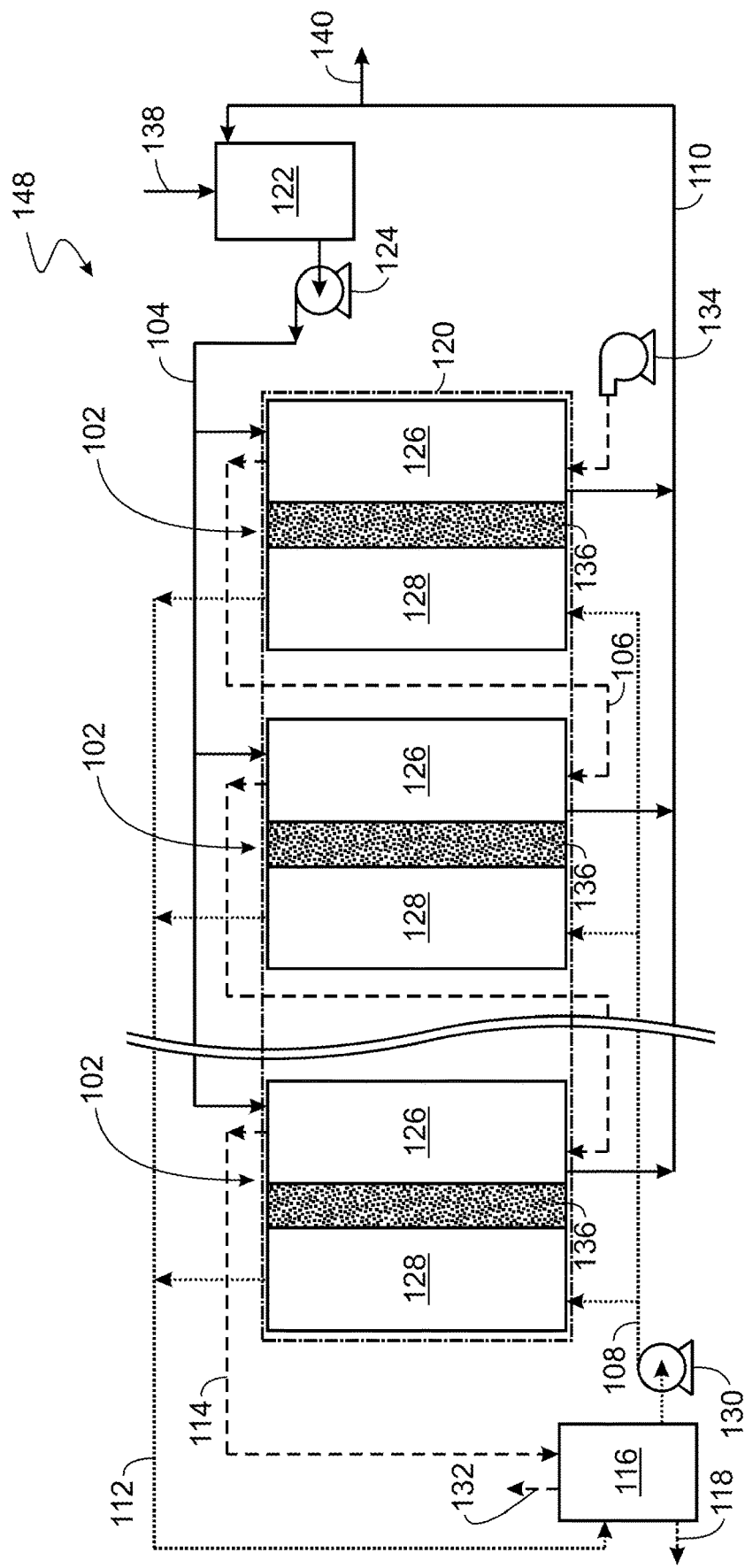
FIG. 1E is a simplified process flow diagram of a MS-SGMD system, wherein the modules are fluidically coupled in parallel to the feed line, the feed return line, and the sweeping gas, but are fluidically coupled in series to the carrier gas line.

FIG. 1E is a simplified process flow diagram of a MS-SGMD system 148, wherein the modules 102 are fluidically coupled in parallel to the feed line 104, the feed return line 110, and the sweeping gas 108, but are fluidically coupled in series to the carrier gas line 106. In this embodiment, the carrier gas line 106 from the blower 134 is fluidically coupled to an inlet on the feed chamber 126 of the first module 102 downstream of the blower 134. Each of the modules 102 downstream of that has a carrier gas line 106 fluidically coupled to an inlet of the feed chamber 126 of the module 102 that is fluidically coupled to an outlet of the feed chamber 126 of the preceding module 102. The carrier gas outlet line 114 from the feed chamber 126 of the last of the modules 102 in the sequence is fluidically coupled to the condenser 116.

Figure 1F:
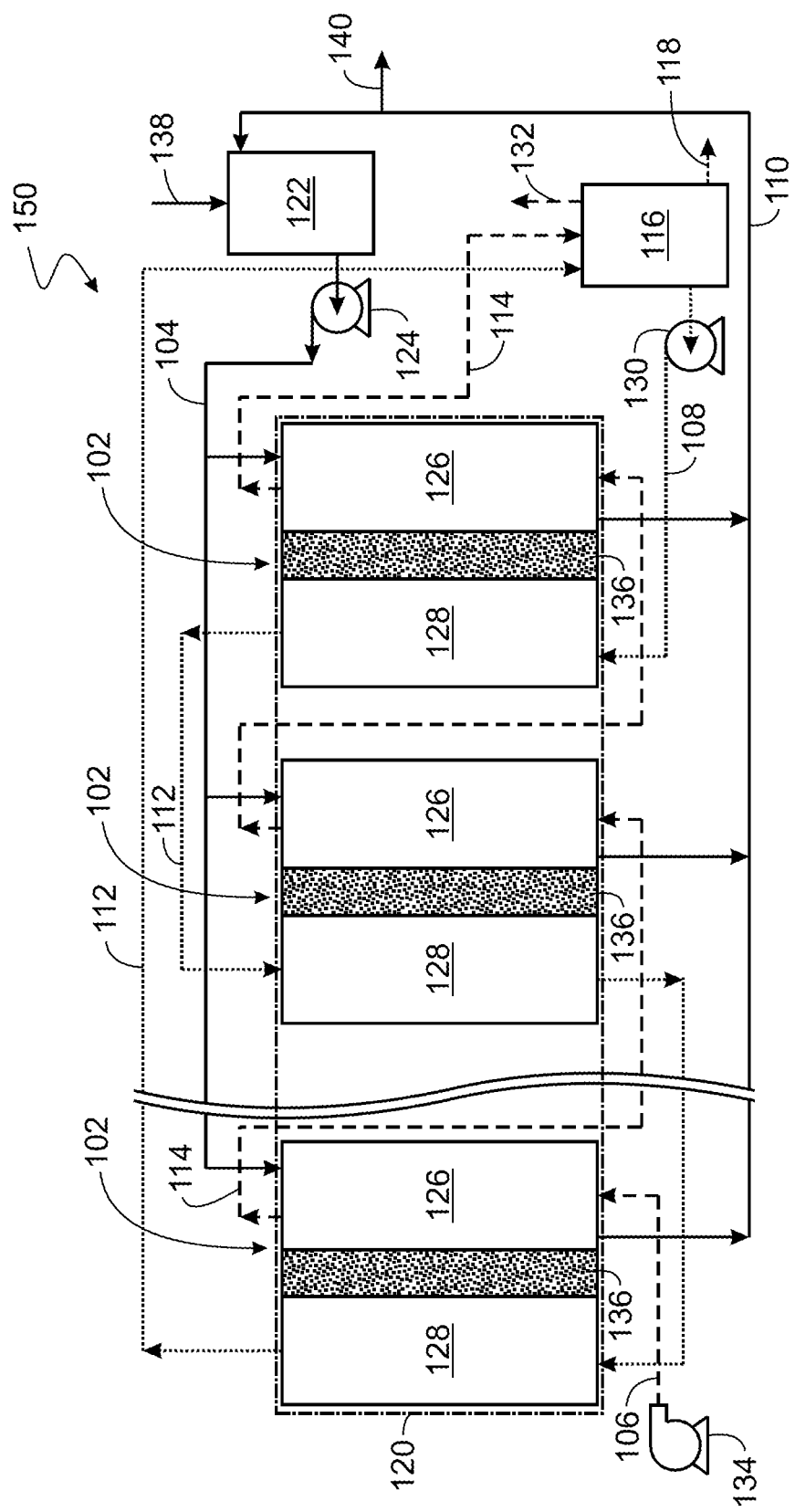
FIG. 1F is a simplified process flow diagram of a MS-SGMD system, wherein the modules are fluidically coupled in parallel to the feed line, and the feed return line, but are fluidically coupled in series to the carrier gas line and the sweeping gas line.

FIG. 1F is a simplified process flow diagram of a MS-SGMD system 150, wherein the modules 102 are fluidically coupled in parallel to the feed line 104, and the feed return line 110, but are fluidically coupled in series to the carrier gas line 106 and the sweeping gas line 108. In this embodiment, the carrier gas line 106 from the blower 134 is fluidically coupled to an inlet on the feed chamber 126 of a first module 102 downstream of the blower 134. Each of the modules 102 downstream of that has a carrier gas line 106 fluidically coupled to an inlet of the feed chamber 126 of the module 102 that is fluidically coupled to an outlet of the feed chamber 126 of the preceding module 102. The carrier gas outlet line 114 from the feed chamber 126 of the last of the modules 102 in the sequence is fluidically coupled to the condenser 116. Further, the sweeping gas line 108 is fluidically coupled to a sweeping gas chamber 128 on a first module 102, and then fluidically fluidically coupled from an outlet of the sweeping gas chamber 128 of the first module 102 to an inlet on the sweeping gas chamber 128 of a next module 102. An outlet of the sweeping gas chamber 128 of the last module 102 in the series is fluidically coupled to the condenser 116 through the sweeping gas outlet line 112.

Figure 1G:
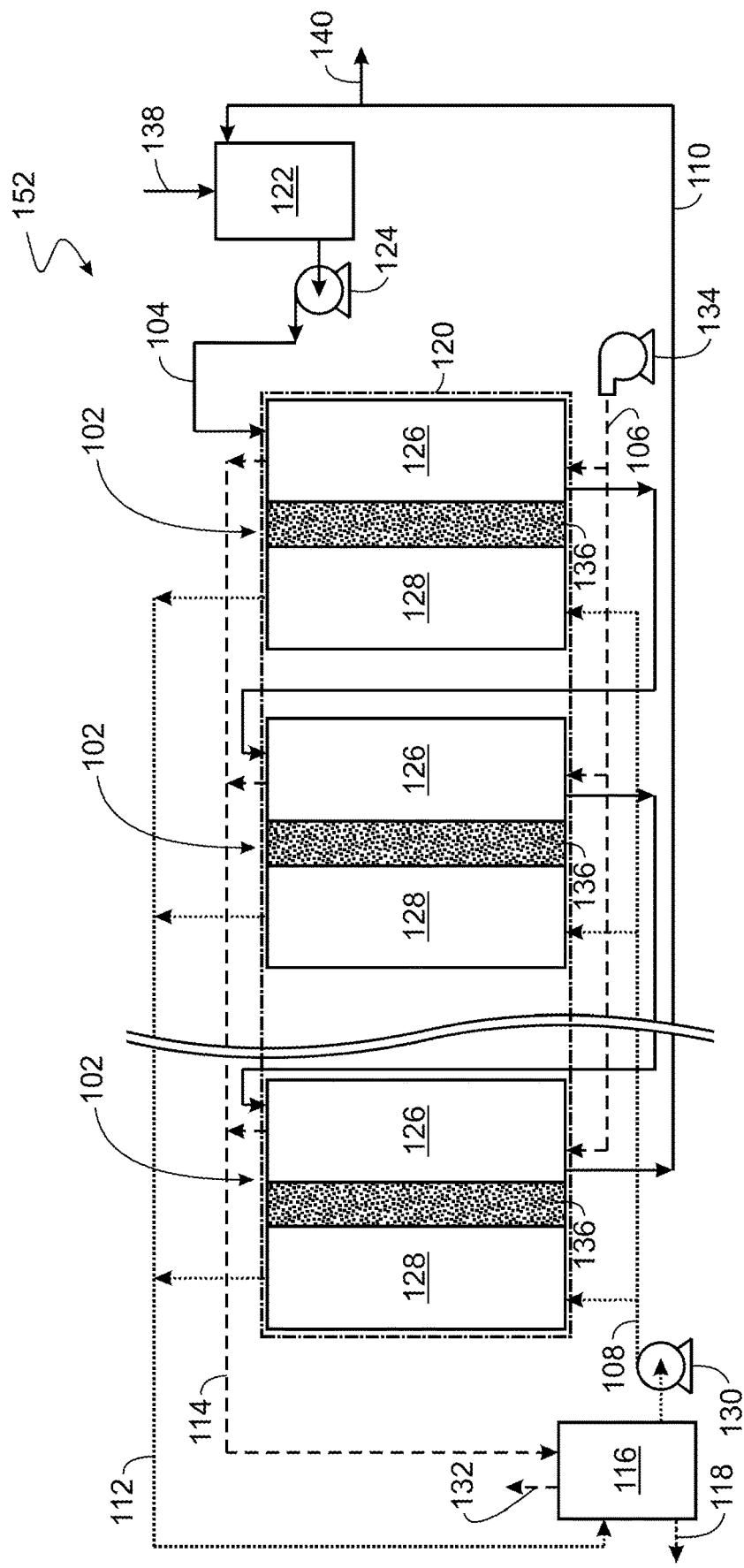
FIG. 1G is a simplified process flow diagram a MS-SGMD system, wherein the modules are fluidically coupled in parallel to the carrier gas line, and the sweeping gas line, but are fluidically coupled in series to the feed line.

FIG. 1G is a simplified process flow diagram a MS-SGMD system 152, wherein the modules 102 are fluidically coupled in parallel to the carrier gas line 106, and the sweeping gas line 108, but are fluidically coupled in series to the feed line 104. In this embodiment, the feed line 104 from the feed pump 124 is fluidically coupled to an inlet on the feed chamber 126 of a first module 102 downstream of the feed pump 124. The feed chamber 126 on each of the modules 102 downstream of that has a feed line 104 fluidically coupled to an inlet of the feed chamber 126 of the module 102 that is fluidically coupled to an outlet of the feed chamber 126 of the preceding module 102. The feed return 110 from the feed chamber 126 of the last of the modules 102 in the sequence is fluidically coupled to the liquid feed tank 122.

As the concentration of the liquid feed increases through the sequential arrangement of the modules 102, the membrane 136 may be adjusted in downstream modules 102 to increase the amount of vapor transferred from the feed chamber 126 to the sweeping gas chamber 128. The sequential arrangement of the liquid feed may lower the energy demands of the MS-SGMD system 154, as the energy input to modules 102 that are upstream may lower the energy needed for modules 102 that are downstream.

Figure 1H:
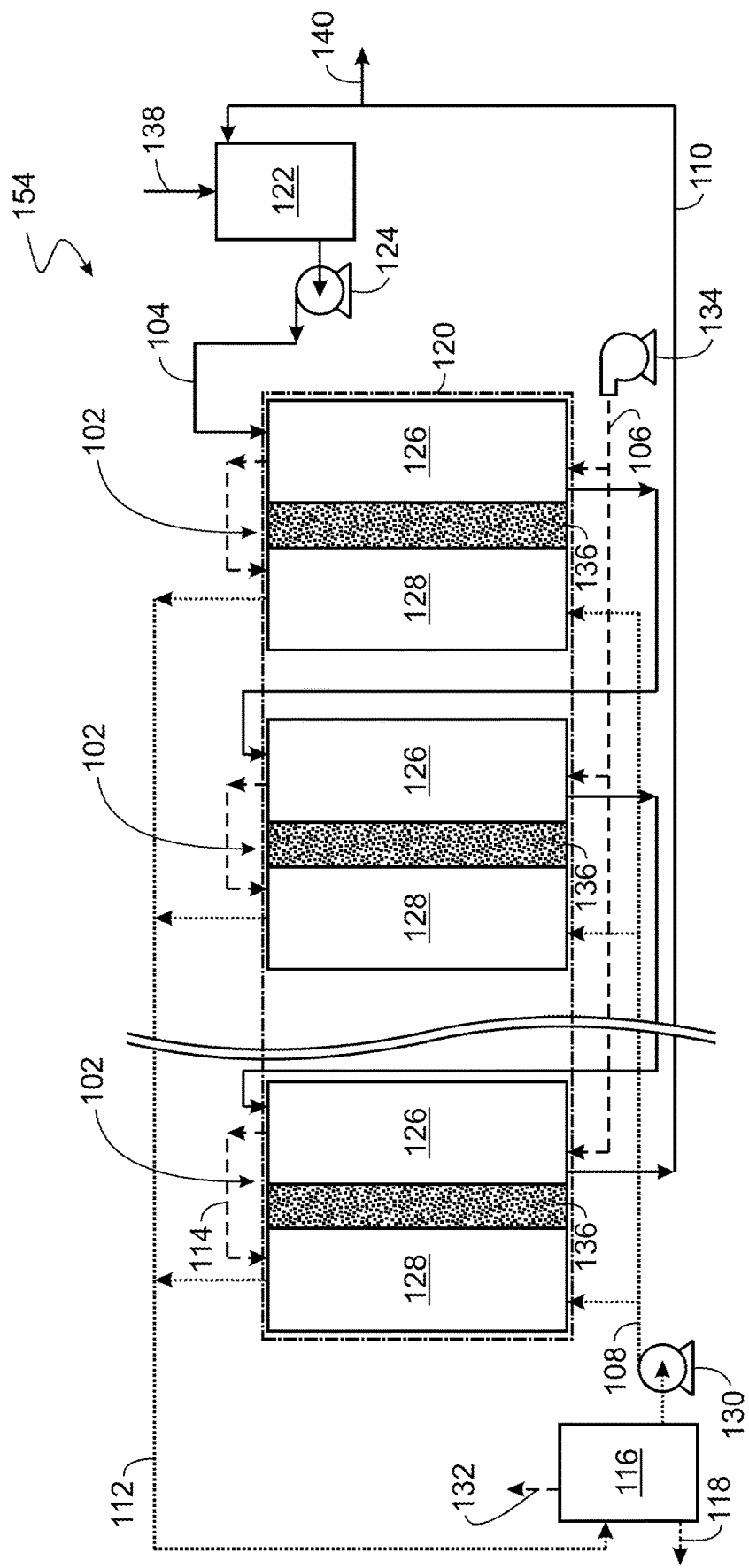
FIG. 1H is a simplified process flow diagram of a MS-SGMD system, wherein the modules are fluidically coupled in parallel to the carrier gas line, the sweeping gas line, and the sweeping gas outlet line, but are fluidically coupled in series to the feed line 104, and the feed return line.

FIG. 1H is a simplified process flow diagram of a MS-SGMD system 154, wherein the modules 102 are fluidically coupled in parallel to the carrier gas line 106, the sweeping gas line 108, and the sweeping gas outlet line 112, but are fluidically coupled in series to the feed line 104, and the feed return line 110. In this embodiment, the feed line 104 from the feed pump 124 is fluidically coupled to an inlet on the feed chamber 126 of a first module 102 downstream of the feed pump 124. The feed chamber 126 on each of the modules 102 downstream of that has a feed line 104 fluidically coupled to an inlet of the feed chamber 126 of the module 102 that is fluidically coupled to an outlet of the feed chamber 126 of the preceding module 102. The feed return 110 from the feed chamber 126 of the last of the modules 102 in the sequence is fluidically coupled to the liquid feed tank 122. Further, the carrier gas outlet line 114 from the feed chamber 126 of each module 102 is fluidically coupled to an inlet on the sweeping gas chamber 128 of that module 102. Accordingly, the sweeping gas that is fed to the feed chamber 126 flows through the sweeping gas chamber 128 and is returned to the condenser 116 through the sweeping gas outlet line 112.

Figure 1I:
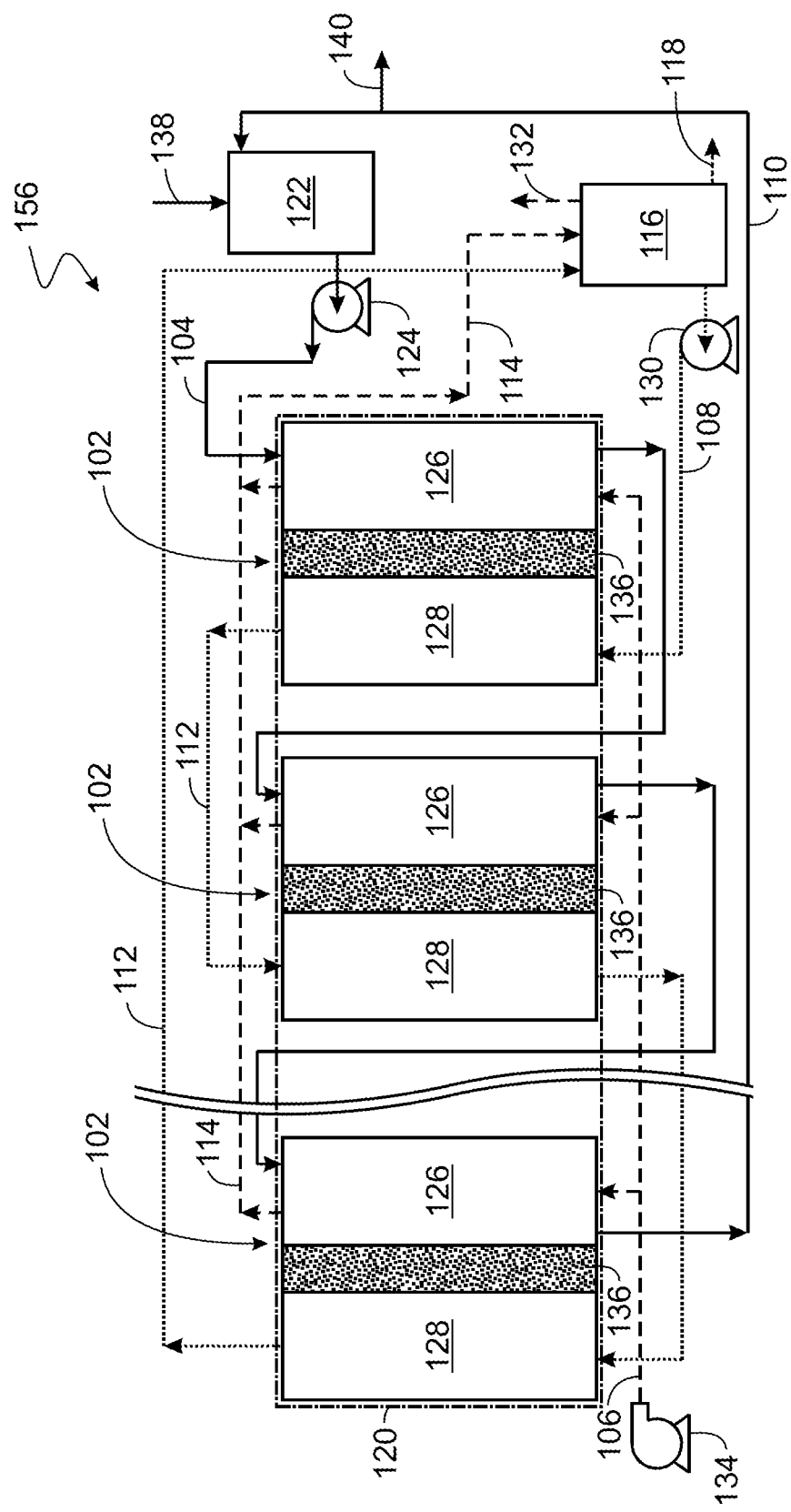
FIG. 1I is a simplified process flow diagram of a MS-SGMD system, wherein the modules are fluidically coupled in parallel to the carrier gas line and the carrier gas outlet line, but are fluidically coupled in series to the feed line and the sweeping gas line.

FIG. 1I is a simplified process flow diagram of a MS-SGMD system 156, wherein the modules 102 are fluidically coupled in parallel to the carrier gas line 106 and the carrier gas outlet line 114, but are fluidically coupled in series to the feed line 104 and the sweeping gas line 108. In this embodiment, the feed line 104 from the feed pump 124 is fluidically coupled to an inlet on the feed chamber 126 of a first module 102 downstream of the feed pump 124. The feed chamber 126 on each of the modules 102 downstream of that has a feed line 104 fluidically coupled to an inlet of the feed chamber 126 of the module 102 that is fluidically coupled to an outlet of the feed chamber 126 of the preceding module 102. The feed return 110 from the feed chamber 126 of the last of the modules 102 in the sequence is fluidically coupled to the liquid feed tank 122. Further, the sweeping gas line 108 is fluidically coupled to a sweeping gas chamber 128 on a first module 102, and then fluidically coupled from an outlet of the sweeping gas chamber 128 of the first module 102 to an inlet on the sweeping gas chamber 128 of a next module 102. An outlet of the sweeping gas chamber 128 of the last module 102 in the series is fluidically coupled to the condenser 116 through the sweeping gas outlet line 112.

Figure 1J:
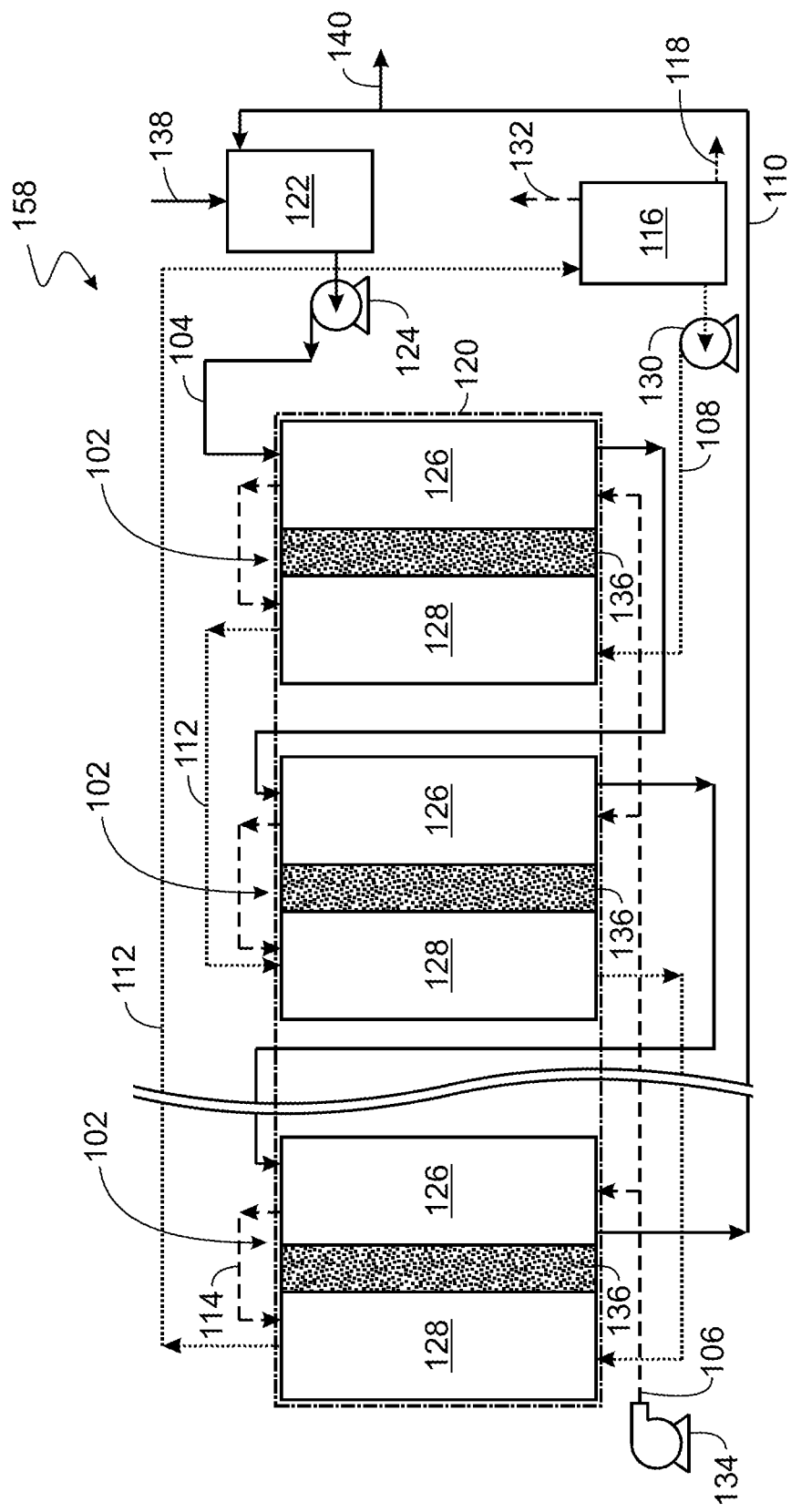
FIG. 1J is a simplified process flow diagram of a MS-SGMD system, wherein the modules are fluidically coupled in parallel to the carrier gas line, but are fluidically coupled in series to the feed line, the feed return line, the sweeping gas line, and the sweeping gas outlet line.

FIG. 1J is a simplified process flow diagram of a MS-SGMD system 158, wherein the modules 102 are fluidically coupled in parallel to the carrier gas line 106, but are fluidically coupled in series to the feed line 104, the feed return line 110, the sweeping gas line 108, and the sweeping gas outlet line 112. In this embodiment, the feed line 104 from the feed pump 124 is fluidically coupled to an inlet on the feed chamber 126 of a first module 102 downstream of the feed pump 124. The feed chamber 126 on each of the modules 102 downstream of that has a feed line 104 fluidically coupled to an inlet of the feed chamber 126 of the module 102 that is fluidically coupled to an outlet of the feed chamber 126 of the preceding module 102. The feed return 110 from the feed chamber 126 of the last of the modules 102 in the sequence is fluidically coupled to the liquid feed tank 122. Further, the sweeping gas line 108 is fluidically coupled to a sweeping gas chamber 128 on a first module 102, and then fluidically coupled from an outlet of the sweeping gas chamber 128 of the first module 102 to an inlet on the sweeping gas chamber 128 of a next module 102. An outlet of the sweeping gas chamber 128 of the last module 102 in the series is fluidically coupled to the condenser 116 through the sweeping gas outlet line 112. In addition, the carrier gas outlet line 114 from the feed chamber 126 of each module 102 is fluidically coupled to an inlet on the sweeping gas chamber 128 of that module 102. Accordingly, the carrier gas that is fed to the feed chamber 126 flows through the sweeping gas chamber 128 and is returned to the condenser 116 through the sweeping gas outlet line 112.

Figure 1K:
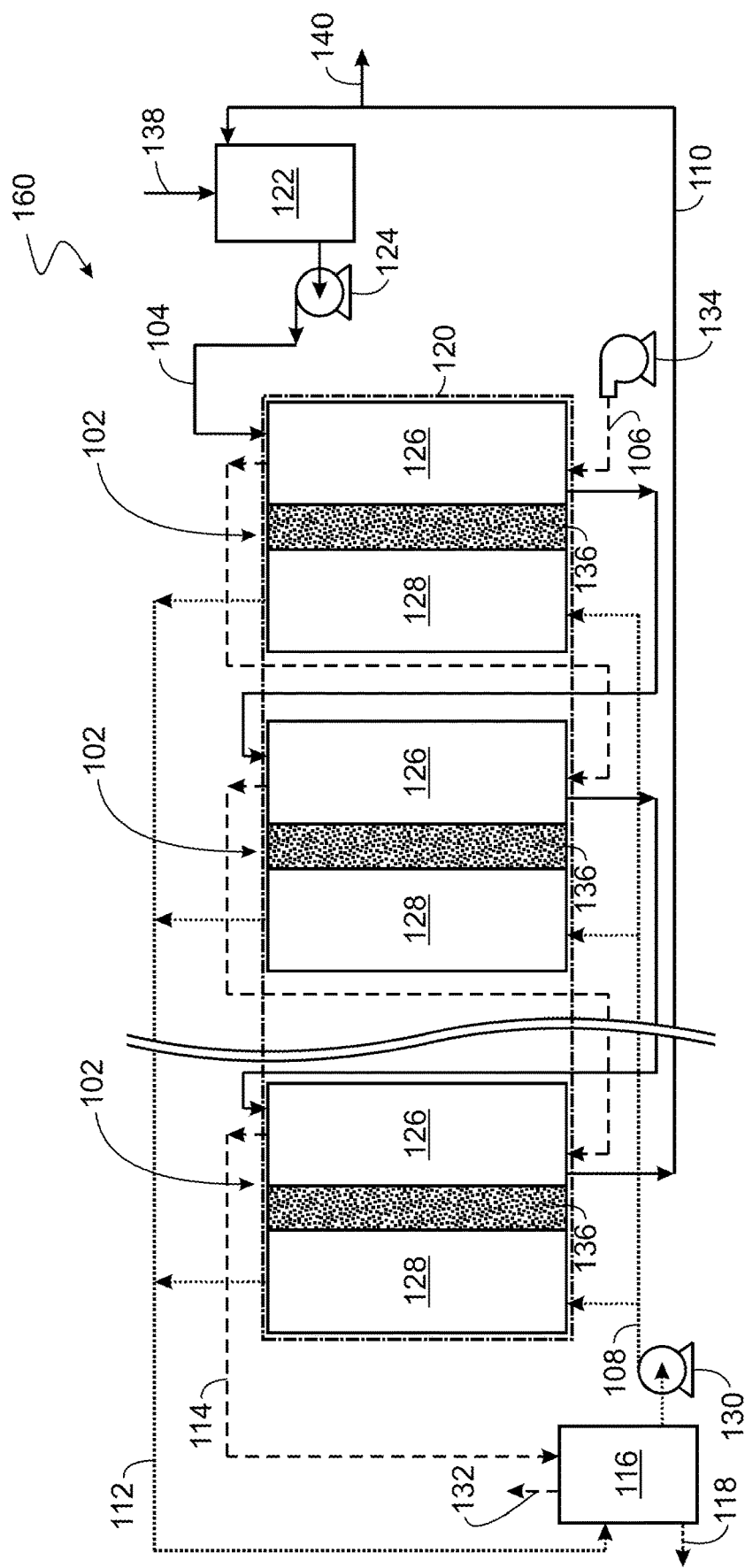
FIG. 1K is a simplified process flow diagram of a MS-SGMD system, wherein the wherein the modules are fluidically coupled in parallel to the sweeping gas line 108 and the sweeping gas return line, but are fluidically coupled in series to the feed line 104 and the carrier gas line.

FIG. 1K is a simplified process flow diagram of a MS-SGMD system 160, wherein the wherein the modules 102 are fluidically coupled in parallel to the sweeping gas line 108 and the sweeping gas return line 112, but are fluidically coupled in series to the feed line 104 and the carrier gas line 106. In this embodiment, the feed line 104 from the feed pump 124 is fluidically coupled to an inlet on the feed chamber 126 of a first module 102 downstream of the feed pump 124. The feed chamber 126 on each of the modules 102 downstream of that has a feed line 104 fluidically coupled to an inlet of the feed chamber 126 of the module 102 that is fluidically coupled to an outlet of the feed chamber 126 of the preceding module 102. The feed return 110 from the feed chamber 126 of the last of the modules 102 in the sequence is fluidically coupled to the liquid feed tank 122. Further, the sweeping gas line 108 is fluidically coupled to a sweeping gas chamber 128 on a first module 102, and then fluidically coupled from an outlet of the sweeping gas chamber 128 of the first module 102 to an inlet on the sweeping gas chamber 128 of a next module 102. An outlet of the sweeping gas chamber 128 of the last module 102 in the series is fluidically coupled to the condenser 116 through the sweeping gas outlet line 112.

Figure 1L:
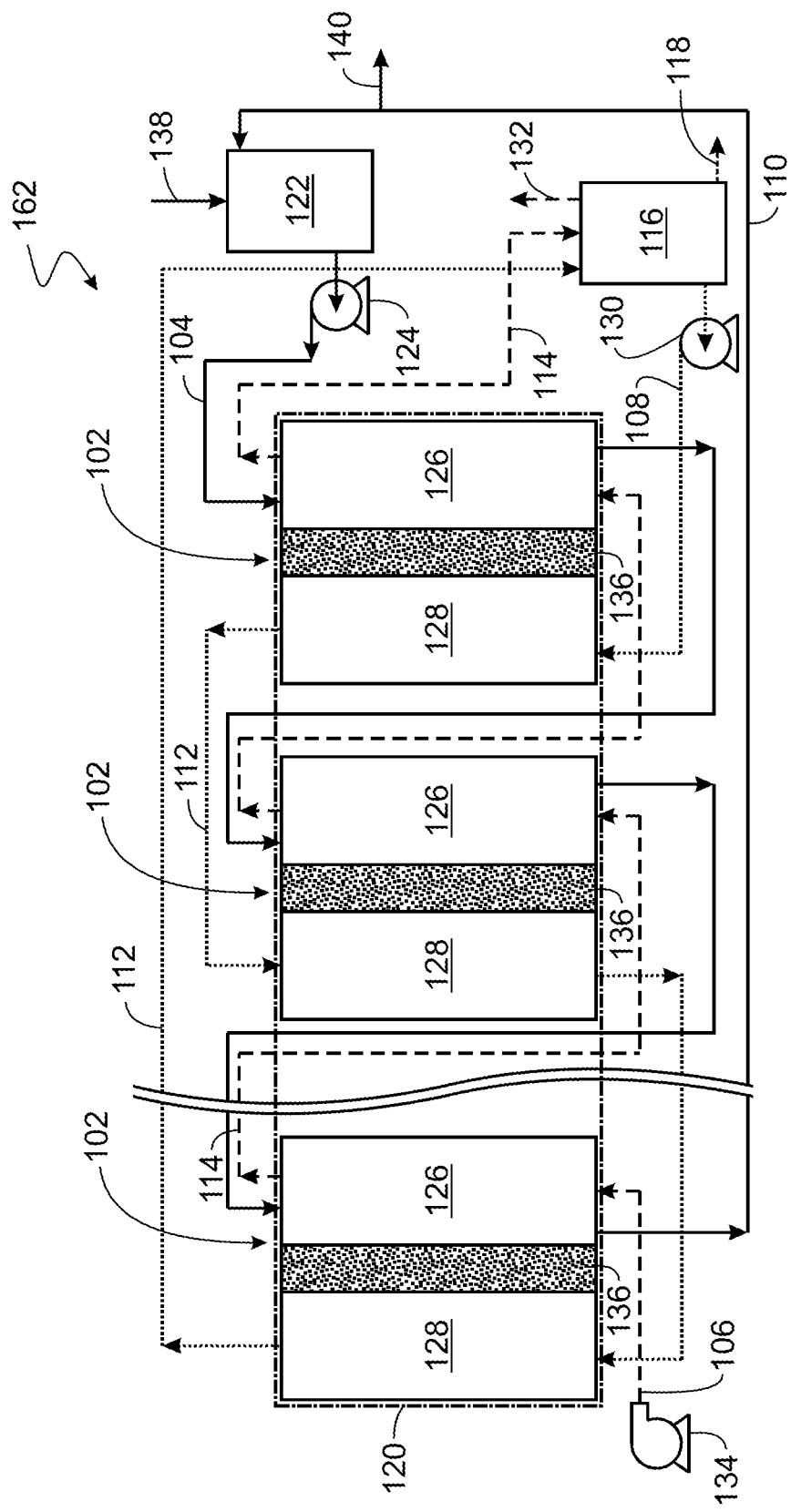
FIG. 1L is a simplified process flow diagram of a MS-SGMD system, wherein the modules are fluidically coupled in series to the feed line, the carrier gas line, and the sweeping gas line.

FIG. 1L is a simplified process flow diagram of a MS-SGMD system 160, wherein the modules 102 are fluidically coupled in series to the feed line 104, the carrier gas line 106, and the sweeping gas line 108. In this embodiment, the feed line 104 from the feed pump 124 is fluidically coupled to an inlet on the feed chamber 126 of a first module 102 downstream of the feed pump 124. The feed chamber 126 on each of the modules 102 downstream of that has a feed line 104 fluidically coupled to an inlet of the feed chamber 126 of the module 102 that is fluidically coupled to an outlet of the feed chamber 126 of the preceding module 102. The feed return 110 from the feed chamber 126 of the last of the modules 102 in the sequence is fluidically coupled to the liquid feed tank 122. Further, the sweeping gas line 108 is fluidically coupled to a sweeping gas chamber 128 on a first module 102, and then fluidically coupled from an outlet of the sweeping gas chamber 128 of the first module 102 to an inlet on the sweeping gas chamber 128 of a next module 102. An outlet of the sweeping gas chamber 128 of the last module 102 in the series is fluidically coupled to the condenser 116 through the sweeping gas outlet line 112. In addition, the carrier gas line 106 from the blower 134 is fluidically coupled to an inlet on the feed chamber 126 of a first module 102 downstream of the blower 134. Each of the modules 102 downstream of that has a carrier gas line 106 fluidically coupled to an inlet of the feed chamber 126 of the module 102 that is fluidically coupled to an outlet of the feed chamber 126 of the preceding module 102. The carrier gas outlet line 114 from the feed chamber 126 of the last of the modules 102 in the sequence is fluidically coupled to the condenser 116.

Figure 2:
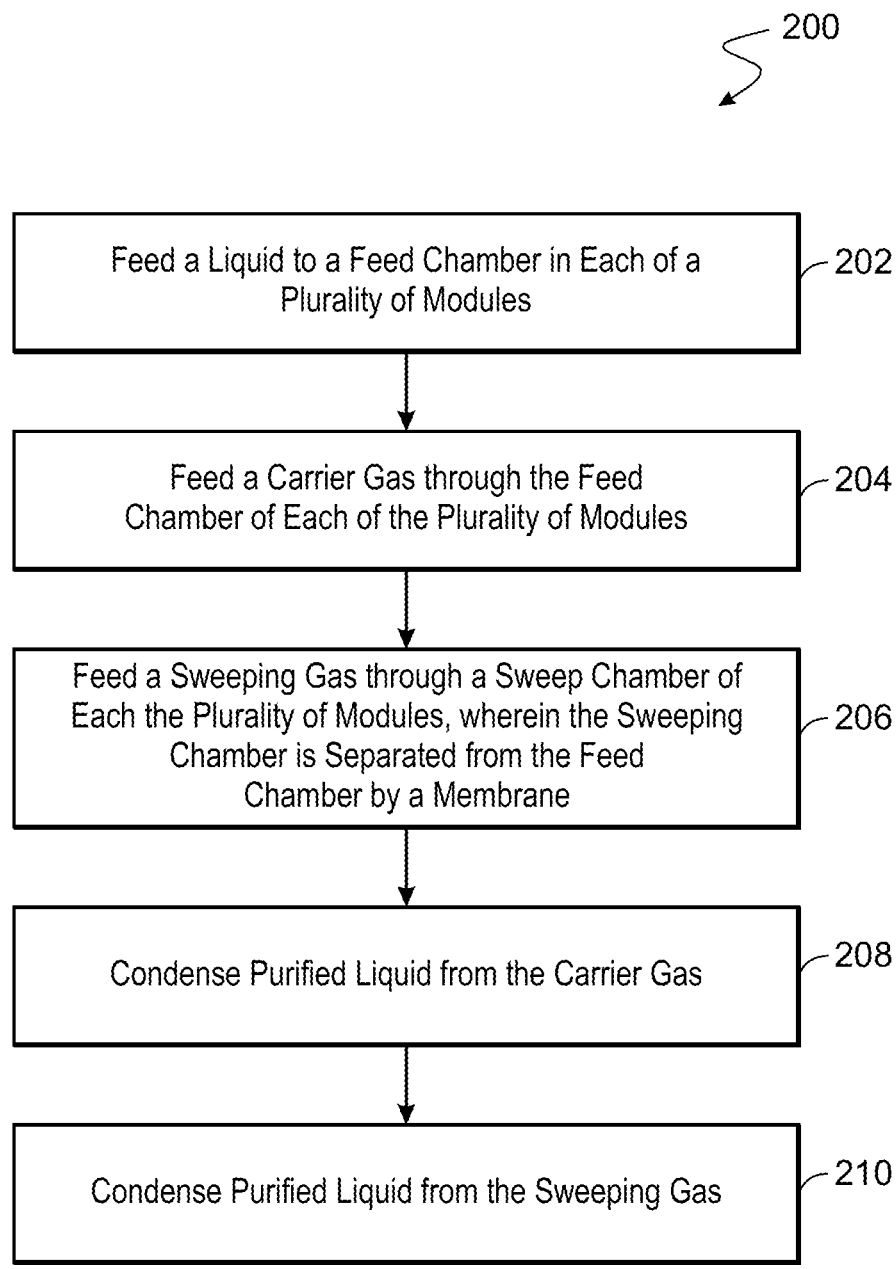
FIG. 2 is a process flow diagram of a method for purifying a liquid feed using a MS-SGMD system.

FIG. 2 is a process flow diagram of a method 200 for purifying a liquid feed using a MS-SGMD system. The method 200 begins at block 202 when a liquid is fed to a feed chamber in each of a plurality of modules. The liquid in the feed chamber is at a temperature of greater than about 50° C. The liquid can be heated before it is fed to the feed chamber or the liquid can be heated in the feed chamber. In some embodiments, the liquid is fed to a feed chamber of a first module of the plurality of modules, and the liquid exiting the feed chamber of the first module of the plurality of modules is then fed to a feed chamber of a second module of the plurality of modules.

At block 204, a carrier gas is fed through the liquid in the feed chamber of each of the plurality of modules to form humidified carrier gas. In some embodiments, the carrier gas is fed to a feed chamber of a first module of the plurality of modules, and then the carrier gas exiting the feed chamber of the first module of the plurality of modules is fed to a feed chamber of a second module of the plurality of modules.

At block 206, a sweeping gas is fed to a sweeping gas chamber in each of the plurality of modules through a sweeping gas line, wherein the sweeping gas chamber in each module is separated from the feed chamber in each module by a membrane, and wherein the membrane allows vapor to pass across the membrane while blocking liquid flow across the membrane. In some embodiments, the sweeping gas is fed to a sweeping gas chamber of a first module of the plurality of modules, and then the sweeping gas exiting the sweeping gas chamber of the first module is fed to a sweeping gas chamber of a second module of the plurality of modules.

At block 208, a purified liquid is condensed from the carrier gas. At block 210, the purified liquid is condensed from the sweeping gas.

The details of one or more implementations of the subject matter of this disclosure are set forth in the accompanying drawings and the description. Other features, aspects, and advantages of the subject matter will become apparent from the description, the drawings, and the claims.

The details of one or more implementations of the subject matter of this disclosure are set forth in the accompanying drawings and the description. Other features, aspects, and advantages of the subject matter will become apparent from the description, the drawings, and the claims.

Embodiments

An embodiment disclosed by example herein provides a multi-stage sweeping gas membrane distillation (MS-SGMD) system. The MS-SGMD includes a plurality of modules, wherein each module includes a feed chamber fluidically coupled to a feed line and a carrier gas line, wherein the feed line introduces a liquid feed into the feed chamber from a liquid feed tank, and wherein the carrier gas line introduces a carrier gas into the feed chamber. Each module includes a sweeping gas chamber fluidically coupled to a sweeping gas line and a sweeping gas return line, wherein a sweeping gas is passed through the sweeping gas chamber. Each module further includes a membrane separating the feed chamber from the sweeping gas chamber, wherein the membrane allows transportation of vapor from the feed chamber to the sweeping gas chamber while blocking liquid from moving from the feed chamber to the sweeping gas chamber.

In an aspect, the MS-SGMD system further includes a condenser fluidically coupled to the sweeping gas return line, wherein purified liquid is condensed from the sweeping gas.

In an aspect, the MS-SGMD system further includes a sweeping gas blower fluidically coupled to the condenser, wherein the sweeping gas blower feeds the sweeping gas through the sweeping gas chamber.

In an aspect, the MS-SGMD system further includes a carrier gas outlet line fluidically coupling a carrier gas outlet on the feed chamber to the condenser tank.

In an aspect, the MS-SGMD system further includes a carrier gas line fluidically coupled to an outlet on the feed chamber and fluidically coupled to an inlet on the sweeping gas chamber.

In an aspect, the plurality of modules are fluidically coupled in parallel to the feed line, the carrier gas line, and the sweeping gas feed line.

In an aspect, the plurality of modules are fluidically coupling in series to the feed line, wherein a liquid input to the feed chamber of a first module in the series is fluidically coupled to the feed line, a liquid outlet of the feed chamber of a last module in the series is fluidically coupled to a feed return line, and each intervening module between the first module and the last module is fluidically coupled by line from a liquid outlet on the feed chamber of the intervening module to a liquid inlet on the feed chamber of the next module.

In an aspect, the plurality of modules are fluidically coupled in series to the sweeping gas feed, wherein a sweeping gas feed line is fluidically coupled to an inlet of the sweeping gas chamber on a first module in the series, a sweeping gas return line is fluidically coupled to an outlet from the cold chamber of a last module in the series, and each intervening module between the first module and the last module is fluidically coupled by a line from an outlet of the sweeping gas chamber of the intervening module to an inlet of the sweeping gas chamber of the next module in the series.

In an aspect, the plurality of modules are fluidically coupled in series to the carrier gas, wherein a carrier gas inlet on the feed chamber of a first module in the series is fluidically coupled to the carrier gas line, a carrier gas outlet of the feed chamber of a last module in the series is fluidically coupled to a carrier gas outlet line, and each intervening module between the first module and the last module is fluidically coupled by line from the gas outlet of the feed chamber of the intervening module to a gas inlet of the feed chamber of the next module.

In an aspect, the MS-SGMD system further includes a heating element in a liquid feed tank, a heat exchanger on the feed line, or both.

In an aspect, the MS-SGMD system further includes a heating element disposed in a feed chamber of a module.

In an aspect, the liquid feed includes an aqueous solution.

In an aspect, the liquid feed includes a liquid including a dissolved salt, a mixture of salts, a salt and an organic contaminant mixture, or a salt and an inorganic contaminant mixture, or any combinations thereof.

In an aspect, the liquid feed includes seawater, industrial wastewater, brackish water, produced water, fruit juice, blood, milk, dye, hazardous-waste water, or a brine solution, or any combinations thereof.

In an aspect, the membrane includes a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, or a polymeric membrane, or any combinations thereof.

In an aspect, the membrane includes a reinforced hollow tube, a non-reinforced hollow tube, a spiral wound 2, a flat sheet, or a non-flat sheet, or any combinations thereof.

In an aspect, a contact angle of a droplet of the liquid feed on the membrane is greater than 90° (degrees).

In an aspect, the carrier gas includes air, nitrogen, helium, argon, or carbon dioxide, or any combinations thereof.

Another embodiment described by example herein provides a method for purifying a liquid using a multi-stage sweeping gas membrane distillation (MS-SGMD) system. The method includes feeding a liquid to a feed chamber in each of a plurality of modules, wherein the liquid in the feed chamber is at a temperature of greater than about 50° C. A carrier gas is fed through the liquid in the feed chamber of each of the plurality of modules to form humidified carrier gas. A sweeping gas is fed through a sweeping gas chamber in each of the plurality of modules, wherein the sweeping gas chamber in each module is separated from the feed chamber in each module by a membrane, and wherein the membrane allows vapor to pass across the membrane while blocking liquid flow across the membrane. A purified liquid is condensed from the sweeping gas. The purified liquid is condensed from the humidified carrier gas.

In an aspect, the method further includes heating the liquid before feeding the liquid to the feed chamber.

In an aspect, the method further includes heating the liquid in the feed chamber.

In an aspect, the method further includes feeding the liquid to a feed chamber of a first module of the plurality of modules, then feeding the liquid exiting the feed chamber of the first module of the plurality of modules to a second module of the plurality of modules.

In an aspect, the method further includes feeding the sweeping gas to the sweeping gas chamber of a first module of the plurality of modules, then feeding the sweeping gas from the first module to the sweeping gas chamber of a second module of the plurality of modules.

In an aspect, the method further includes feeding the carrier gas through a feed chamber of a first module of the plurality of modules, then feeding the carrier gas exiting the feed chamber of the first module of the plurality of modules to a feed chamber of a second module of the plurality of modules.

Other implementations are also within the scope of the following claims.

What is claimed is:

1. A multi-stage sweeping gas membrane distillation (MS-SGMD) system comprising:
a feed line configured to flow a liquid feed, the feed line fluidically coupled to a liquid feed tank configured to store the liquid feed;
a carrier gas line configured to flow a carrier gas;
a sweeping gas configured to flow a sweeping gas;
a plurality of modules fluidically coupled in parallel to each other and to the feed line, the carrier gas line and the sweeping gas line, wherein each of the plurality of modules comprises:
a feed chamber fluidically coupled to the feed line and the carrier gas line, wherein the feed line introduces the liquid feed into the feed chamber from the liquid feed tank, and wherein the carrier gas line introduces the carrier gas into the feed chamber;
a sweeping gas chamber fluidically coupled to the sweeping gas, wherein the sweeping gas is passed through the sweeping gas chamber; and
a membrane separating the feed chamber from the sweeping gas chamber, wherein the membrane allows transportation of the vapor from the feed chamber to the sweeping gas chamber while blocking liquid from moving from the feed chamber to the sweeping gas chamber;
a sweeping gas return line fluidically coupled to each sweeping gas chamber in each of the plurality of modules, the sweeping gas return line configured to flow the sweeping gas and a vapor from each feed chamber that has migrated to each respective sweeping gas chamber;
a carrier gas outlet line fluidically coupled to each feed chamber in each of the plurality of modules, the carrier gas outlet line configured to flow the carrier gas flowed out of each feed chamber, wherein the carrier gas is at least partially saturated with vapor in the liquid feed; and
a condenser fluidically coupled to the sweeping gas return line and the carrier gas outlet line, the condenser configured to condense vapor flowed through the sweeping gas return line and vapor carried by the carrier gas.

2. The MS-SGMD system of claim 1, further comprising a sweeping gas blower fluidically coupled to the condenser, wherein the sweeping gas blower feeds the sweeping gas through the sweeping gas chamber.

3. The MS-SGMD system of claim 1, wherein the carrier gas line is fluidically coupled to an outlet on each feed chamber in each of the plurality of modules and fluidically coupled to an inlet on each sweeping gas chamber in each of the plurality of modules.

4. The MS-SGMD system of claim 1, comprising a heating element in the liquid feed tank, a heat exchanger on the feed line, or both.

5. The MS-SGMD system of claim 1, comprising a heating element disposed in a feed chamber of a module.

6. The MS-SGMD system of claim 1, wherein the liquid feed comprises an aqueous solution.

7. The MS-SGMD system of claim 1, wherein the liquid feed comprises a liquid including a dissolved salt, a mixture of salts, a salt and an organic contaminant mixture, or a salt and an inorganic contaminant mixture, or any combinations thereof.

8. The MS-SGMD system of claim 1, wherein the liquid feed comprises seawater, industrial wastewater, brackish water, produced water, fruit juice, blood, milk, dye, hazardous-waste water, or a brine solution, or any combinations thereof.

9. The MS-SGMD system of claim 1, wherein the membrane comprises a composite membrane, a nano-composite membrane, a hydrophobic membrane, an omniphobic membrane, a hydrophilic and hydrophobic composite dual layer membrane, a modified ceramic membrane, a porous ceramic membrane, a surface modified membrane, a polymer electrolyte membrane, a porous graphene membrane, or a polymeric membrane, or any combinations thereof.

10. The MS-SGMD system of claim 1, wherein the membrane comprises a reinforced hollow tube, a non-reinforced hollow tube, a spiral wound 2, a flat sheet, or a non-flat sheet, or any combinations thereof.

11. The MS-SGMD system of claim 1, wherein a contact angle of a droplet of the liquid feed on the membrane is greater than 90° (degrees).

12. The MS-SGMD system of claim 1, wherein the carrier gas comprises air, nitrogen, helium, argon, or carbon dioxide, or any combinations thereof.

* * * * *